United States Patent
Baur et al.

(10) Patent No.: US 7,657,358 B2
(45) Date of Patent: Feb. 2, 2010

(54) ENTERTAINMENT SYSTEM INCLUDING A VEHICLE WITH A SIMULATION MODE

(75) Inventors: Andrew Baur, Waterford, MI (US); Tony Koenigsknecht, Saint Joseph, MI (US)

(73) Assignee: Greycell, LLC, Waterford, MI (US)

( * ) Notice: Subject to any disclaimer, the term of this patent is extended or adjusted under 35 U.S.C. 154(b) by 849 days.

(21) Appl. No.: 11/156,218

(22) Filed: Jun. 17, 2005

(65) Prior Publication Data

US 2006/0004495 A1   Jan. 5, 2006

Related U.S. Application Data

(60) Provisional application No. 60/585,539, filed on Jul. 2, 2004.

(51) Int. Cl.
*A63F 9/14* (2006.01)
*A63K 1/00* (2006.01)

(52) U.S. Cl. ............................ 701/70; 701/41; 463/58; 473/85

(58) Field of Classification Search ............ 701/1
See application file for complete search history.

(56) References Cited

U.S. PATENT DOCUMENTS

| | | | | |
|---|---|---|---|---|
| 2,909,853 A * | 10/1959 | Port | ................................ | 434/54 |
| 3,542,934 A * | 11/1970 | Frizell et al. | ................... | 434/29 |
| 3,722,884 A * | 3/1973 | Brown | ............................ | 273/442 |
| 3,734,497 A * | 5/1973 | Brown | ............................ | 273/442 |
| RE27,984 E * | 4/1974 | Ravich | ........................ | 434/237 |
| 4,660,528 A | 4/1987 | Buck | | |
| 4,728,104 A * | 3/1988 | Cheng | ............................ | 104/289 |
| 4,926,161 A | 5/1990 | Cupp | | |
| 5,053,768 A | 10/1991 | Dix, Jr. | | |
| 5,184,694 A * | 2/1993 | Magrath et al. | ............... | 180/167 |
| 5,203,563 A * | 4/1993 | Loper, III | ................ | 273/148 B |
| 5,299,810 A * | 4/1994 | Pierce et al. | ...................... | 463/2 |
| 5,913,378 A | 6/1999 | Brister | | |
| 5,990,880 A | 11/1999 | Huffman | | |
| 6,170,596 B1 | 1/2001 | Triarsi | | |
| 6,302,421 B1 | 10/2001 | Lee | | |
| 6,411,887 B1 | 6/2002 | Martens | | |
| 6,553,288 B2 | 4/2003 | Taguchi | | |
| 2003/0079207 A1* | 4/2003 | Xavier et al. | .................. | 717/135 |
| 2005/0155441 A1* | 7/2005 | Nagata | ........................ | 73/865.3 |
| 2005/0186884 A1* | 8/2005 | Evans | ............................ | 446/456 |

* cited by examiner

*Primary Examiner*—Thomas G Black
*Assistant Examiner*—Shelley Chen
(74) *Attorney, Agent, or Firm*—Jeffrey Schox

(57) ABSTRACT

The entertainment system of the preferred embodiment comprises a first vehicle including a user interface adapted to accept a vehicle input from a first user. The first vehicle further includes an event sensor adapted to sense a first trigger event, and a processor connected to the user interface and to the event sensor and adapted to operate in the following modes: normal mode and simulation mode. In the normal mode, the processor controls the first vehicle based substantially on the vehicle input from the first user. In the simulation mode, the processor controls the first vehicle based on a modification of the vehicle input from the first user according to a first rule, which simulates a first physical event.

24 Claims, 3 Drawing Sheets

ENTERTAINMENT SYSTEM INCLUDING A VEHICLE WITH A SIMULATION MODE

CROSS-REFERENCE TO RELATED APPLICATIONS

This application claims the benefit of U.S. Provisional Application Ser. No. 60/585,539, filed 2 Jul. 2004, which is incorporated in its entirety by this reference.

TECHNICAL FIELD

This invention relates generally to the entertainment field, and more specifically to an entertainment system including a vehicle that, upon sensing a trigger event, simulates a physical event.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
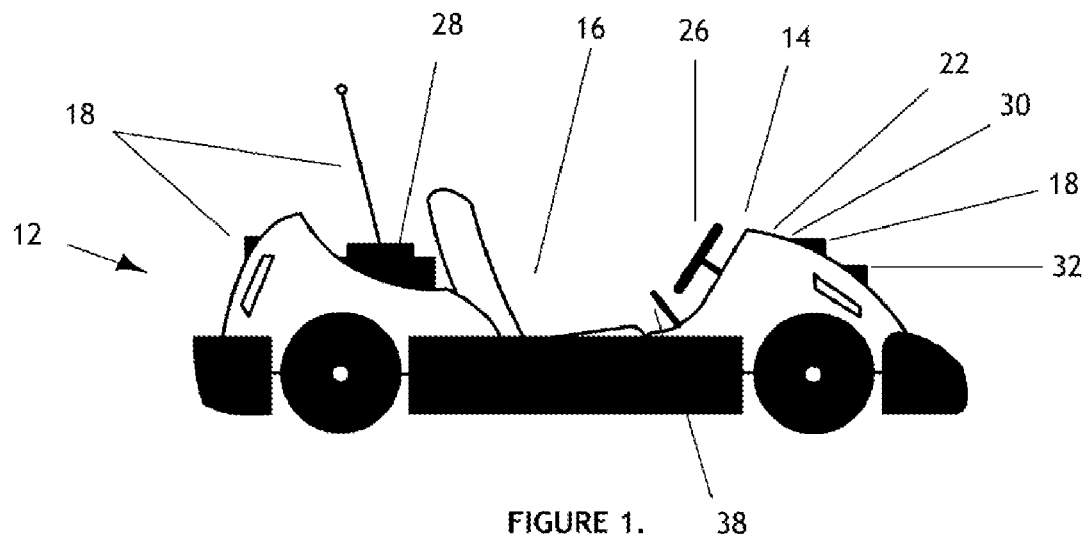
FIG. 1 are representations of the first variation of the first vehicle including a user interface, a first user, an event sensor, a processor, a steering subsystem, a propulsion subsystem, an activation device, a memory device, and a simulated weapon.
Figure 2:
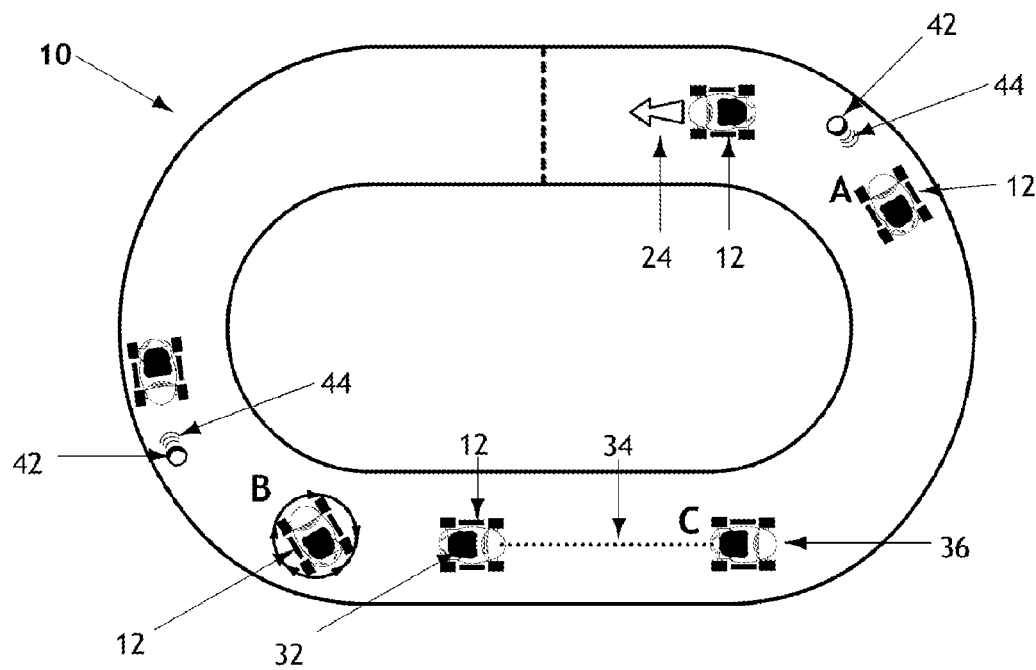
FIG. 2 is a first variation of the entertainment system configured as a simple land course.

As shown in FIGS. 1 and 2 the entertainment system 10 of the preferred embodiments includes a first vehicle 12 including a user interface 14 adapted to accept a vehicle input from a first user 16. The first vehicle 12 further includes an event sensor 18 adapted to sense a first trigger event, and a processor 22 adapted to operate in the following modes: normal mode and simulation mode. In the normal mode, the processor 22 controls the first vehicle 12 based substantially on the vehicle input from the first user 16. In the simulation mode, the processor 22 controls the first vehicle 12 based on a modification of the vehicle input from the first user 16 according to a first rule, which simulates a first physical event.

The first vehicle 12 of the preferred embodiments functions to transport the first user 16. Preferably, the first vehicle 12 is a four-wheel cart. Alternatively, the first vehicle 12 may be another wheeled vehicle (such as a motorcycle or a bicycle), a watercraft (such as a bumper boat, a jet ski, or a motorboat), an aircraft (such as a small plane or a hovercraft), a tracked vehicle (such as a snowmobile or a tank), or a railed vehicle (such as a train), or a wind, gravity, or human-powered vehicle (such as a kiteboard, a snowboard, or a skateboard). The first vehicle 12 may, however, be any suitable vehicle that transports the first user 16.

In the preferred embodiments, the first vehicle 12 further includes a steering subsystem 26. The steering subsystem 26 functions to allow steering of the first vehicle 12. Preferably, the steering subsystem 26 includes mechanisms to turn the wheels of a wheeled vehicle or to turn the impeller of a water vehicle, but the steering subsystem 26 may include any suitable device or system to steer the first vehicle 12. The steering subsystem 26 also preferably includes a disabled mode that reduces or completely eliminates the control of the first user over the steering of the first vehicle 12. In a first variation, the disable mode is accomplished through the deactivation of a "drive-by-wire" steering device. In a second variation, the disabled mode is accomplished through the lowering of a caster (or other suitable device) that prevents the wheels or impeller from effectively turning the first vehicle 12. The steering subsystem 26 may include any suitable device that reduces or completely eliminates the control of the first user over the steering of the first vehicle 12.

In the preferred embodiments, the first vehicle 12 further includes a propulsion subsystem 28. The propulsion subsystem 28 functions to propel the first vehicle 12. Preferably, the propulsion subsystem 28 includes an electrical battery and an electric motor that is connected to the wheels or impeller of the first vehicle 12. Alternatively, the propulsion system 28 may include an internal combustion engine connected to the wheels or impeller of the first vehicle 12, or may include a device or system to harness wind, gravity, or human power (such as a sail, low-resistance wheels, or pedals). Further, the propulsion system may include any suitable device or system to steer the first vehicle 12. Like the steering subsystem 26, the propulsion subsystem 28 preferably includes a disabled mode that reduces or completely eliminates the control of the first user over the propulsion of the first vehicle 12. In a first variation, the disable mode is accomplished through the deactivation of a "drive-by-wire" throttle device. In a second variation, the disabled mode is accomplished through the lowering of a caster (or other suitable device) that prevents the wheels or impeller from effectively propelling the first vehicle 12. The propulsion subsystem 28 may include any suitable device that reduces or completely eliminates the control of the first user over the propulsion of the first vehicle 12.

In the preferred embodiments, the entertainment system 10 further includes multiple vehicles, including a second vehicle 36. Like the first vehicle 12, the second vehicle 36 preferably includes a user interface adapted to accept a vehicle input from a second user, an event sensor adapted to sense a first trigger event, and a processor connected to the user interface and the event sensor and adapted to operate in the following modes: normal mode and simulation mode. In normal mode, the processor controls the second vehicle 36 based substantially on the vehicle input from the second user. In simulation mode, the processor controls the second vehicle 36 based on a modification of the vehicle input from the second user according to a first rule, which simulates a first physical event. The second vehicle 36 further preferably includes a steering subsystem and a propulsion subsystem. The second vehicle 36 is preferably one of the several variations of the first vehicle 12, but may alternatively be any suitable vehicle. Further, although the second vehicle 36 is preferably driven by a human, the second vehicle may be controlled from a distance by another human or by a machine. Further still, although the second vehicle 36 is preferably tangible, the second vehicle 36 may be virtually displayed to the first user 16.

The user interface 14 of the preferred embodiments functions to accept the vehicle input from the first user 16 and communicate with the processor 22. The user interface 14 preferably includes one or more of the following subsystems: a steering device to accept steering input (such as a steering wheel, handlebars, a rudder, or any other suitable steering devices), acceleration and deceleration devices to accept acceleration and/or velocity input and deceleration input (such as throttles or brakes adapted for hand or foot activation, or any other suitable acceleration and deceleration devices), and an activation device 38 to accept other inputs (such as a touch screen, voice recognition, or any other suitable means of accepting input from the first user 16). The user interface 14 may also further include feedback devices to communicate information from the first vehicle 12 to the first user 16 (such as LCD screens that indicate items collected or fuel level, or any other suitable communication device), and/or tactile devices to provide other feedback to the first user 16 (such as a rumble seat, a vibrating steering device, or any other suitable means of providing tactile feedback). The user interface 14 may include any suitable combination and permutation of these various devices.

The event sensor 18 of the preferred embodiment functions to sense a first trigger event. In a first variation, the event sensor 18 is a contact switch that senses physical contact between the first vehicle 12 and another object (such as a physical barrier or a second vehicle). In a second variation, the event sensor 18 is a receiver that receives wireless signals (such as IR signals, RF signals, or other suitable wireless signals). The event sensor 18 of the second variation may be further adapted to transmit an acknowledgement signal upon successful receipt of a wireless signal. In a third variation, the event sensor 18 is a magnetic sensor that senses a change in the magnetic field. While the event sensor 18 is preferably one of these variations, the event sensor 18 may alternatively be any other suitable sensor to sense a first trigger event. The first vehicle 12 preferably includes either a single event sensor 18 that is adapted to sense multiple trigger events, or multiple event sensors 18 each adapted to sense one or more trigger events.

Figure 3:
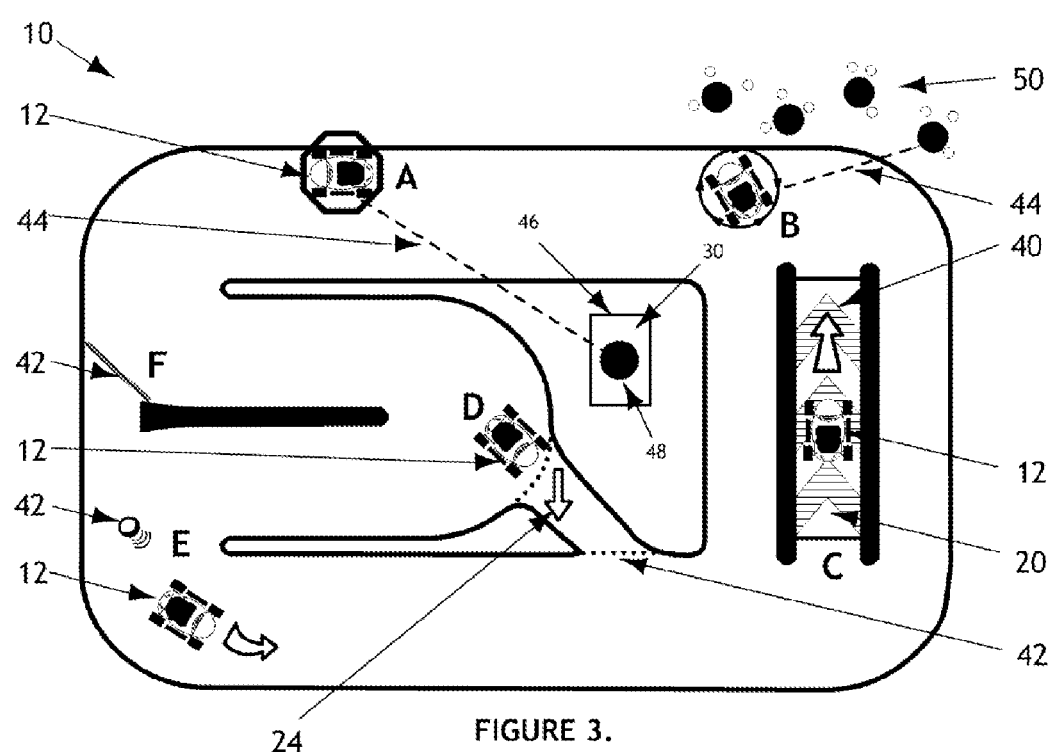
FIG. 3 is a second variation of the entertainment system configured as an advanced land course.

The processor 22 is connected to the user interface 14 and to the event sensor 18. The processor 22 is preferably a digital controller, but may alternatively be an analog controller, a mechanical controller, or any other suitable controller. The processor 22 is preferably located in the first vehicle 12, but may alternatively be located in a remote area. Further, if located in a remote area, the processor 22 may be a central processor 46, separate from the first vehicle 12 and the second vehicle 36, and adapted to function as the processor 22 for both the first vehicle 12 and second vehicle 36 (as shown in FIG. 3). The processor 22 is adapted to operate the vehicle in normal mode wherein the processor 22 controls the first vehicle 12 based substantially on the vehicle input from the first user 16. The processor 22 is also adapted to operate the vehicle in simulation mode wherein the processor 22 controls the first vehicle 12 based on a modification of the vehicle input from the first user 16 according to a first rule. The processor 22 in the simulation mode preferably controls the steering subsystem 26 and/or the propulsion subsystem 28. In a first variation, the processor 22 transitions from normal mode to simulation mode upon the sensing by the event sensor 18 of the first trigger event. In a second variation, the processor 22 transitions from normal mode to simulation mode upon the sensing by the event sensor 18 of the first trigger event and the activation by the user of the activation device 38. In a third variation, the processor 22 transitions from normal mode to simulation mode upon the sensing by the event sensor 18 of a first trigger event, and the processor 22 transitions from simulation mode to normal mode upon the sensing by the event sensor 18 of a second trigger event. In a fourth variation, the processor 22 does not transition from a normal mode to a simulation mode upon the sensing by the event sensor 18 of a first trigger event if the sensing by the event sensor 18 of a second trigger event has occurred first.

While the processor 22 is preferably includes one or more of these variations, the processor 22 may alternatively be any other suitable connection between the user interface 14 and the event sensor 18.

In the preferred embodiments, the first vehicle 12 further includes a memory device 30 adapted to store the trigger events. The memory device 30 functions to store the trigger events and other suitable events (such as placement or rank) experienced by the first user 16 during a particular round. With this feature, the first user 16 may retrieve the stored events thereby affecting the normal mode of the processor 22 for the first vehicle in subsequent rounds. In the first variation, the memory device 30 is included in the first vehicle. In a second variation, the memory device 30 is separate from the first vehicle 18 and the second vehicle 36 (as shown in FIG. 3). The memory device 30 of these variations is preferably a conventional memory chip, such as RAM, but may alternatively be any suitable device able to store information.

In the preferred embodiments, the first vehicle 12 further includes a simulated weapon 32 adapted to be controlled by the first user 16 and adapted to transmit one or more weapon signals 34. The simulated weapon 32 functions to allow the first user 16 (or another passenger in the first vehicle 12) to affect the vehicles of the other users in the entertainment system 10 and/or the environment itself. The simulated weapon 32 is adapted to transmit a weapon signal 34. The weapon signal 34 simulates the ammunition from the simulated weapon 32. Preferably, the weapon signal 34 is a wireless signal. Alternatively, the weapon signal 34 may be an analog signal transmission (where the weapon signal 34 closes a circuit or switch, or interrupts a light beam or laser), a physical element (such as air, water, or any other suitable medium), or a combination of a wireless signal and a physical element. The weapon signal 34 is preferably one of these variations, but alternatively may be any other suitable signal.

As shown in FIGS. 2 and 3, the entertainment system 10 of the preferred embodiment also includes an event element 42, which functions to initiate a trigger event. The event element 42 is preferably separate from the first vehicle 12 and is preferably located on an area of the track. The event element may be continuous (such as the physical barrier that surrounds the track), may be an extended zone (such as a zone within the track), or may be a particular point. The event element 42 may be stationary or movable.

The event element 42 of the preferred embodiment is preferably adapted to be controlled either by a central processor or by an internal processor. The event element 42, however, is also preferably adapted to be modified by a moderator 48, a spectator 50, the first user 16, and/or a second user. The moderator 48 preferably moderates the use of the entertainment system 10. The moderator 48 may be provided with a command center or handheld device that is wirelessly connected or wired to the entertainment system 10 and includes buttons, voice recognition and activation, a touch screen, or any other suitable means to provide input to the entertainment system 10. The spectator 50 is preferably a visitor to the entertainment system 10. The spectator 50 may be provided with a tabletop or handheld device that is wirelessly connected or wired to the entertainment system 10 and that includes control buttons, voting buttons, voice recognition and activation, a touch screen or any other suitable means to provide input to the entertainment system 10.

The event element 42 of the preferred embodiment is one of several variations. In a first variation, the event element 42 is a physical barrier. In a second variation, the event element 42 is a transmitter that transmits a wireless signal 44 (such as an IR signal, an RF signal, an ultrasonic or acoustic signal, or a GPS or satellite signal). In a third variation, the event element 42 is a transmitter that transmits a physical element (such as water, air, or any other suitable physical element). The wireless signal 44 of the second variation and the physical element of the second variation are both intended to be received by the event sensor 18 of the first vehicle 12. The event element 42 of the second and third variation may be further adapted to receive an acknowledgement signal from an event sensor 18. The event element 42 of the second and third variations may be further adapted to temporarily cease transmission of the wireless signal 44 and the physical element upon the successful receipt of the acknowledgement signal from the event sensor 18. The event element 42 of the second and third variation may be further adapted to transmit both a wireless signal and a physical element. In a fourth variation, the event element 42 is a magnetic device that induces a change in the magnetic field. The event element 42 and the signal 44 are both preferably one of the variations described but may be any suitable element and signal.

The first trigger event of the preferred embodiment functions to initiate the modification of the vehicle inputs, which simulates a physical event (either a "positive" event or a "negative" as viewed by the first user). The first trigger event is preferably a communication between the event element 18 and the event sensor (such as a physical connection or a wireless communication).

The first physical event of the preferred embodiment functions to simulate an event in the "real world." A first physical event occurs when the processor 22 operates in the simulation mode. In the simulation mode, the processor 22 controls the steering subsystem 26 and/or the propulsion subsystem 28 based on a modification of the vehicle input from the first user 16 according to a first rule. In a first variation, the first rule is a reduction of the vehicle input to the steering subsystem 26, which results in a first physical event distinguished by reduced control of the first vehicle 12 by the first user 16 and which simulates driving through an area with reduced traction (such as ice or oil). In a second variation, the first rule is a reduction of the vehicle input to the propulsion subsystem 28, which results in a first physical event distinguished by reduced acceleration (or top velocity) of the first vehicle 12 and which simulates driving into a head wind or through difficult terrain (such as mud or sand). In a third variation, the first rule is a complete reduction of the vehicle input, which results in a first physical event distinguished by complete lack of control of the first vehicle 12 by the first user 16 and which simulates a crashed, disabled, or low-energy (or low-power) vehicle. In a fourth variation, the first rule is an increase in the vehicle input to the propulsion subsystem 28, which results in a first physical event distinguished by increased acceleration (or top velocity) of the first vehicle 12 and which simulates driving with a tail wind or through easy terrain (such as smooth concrete). With any of these variation 2, the first rule may be applied for a given time period, until a second trigger event occurs, or based on any other suitable parameter. In other variations, the first rule may include any suitable modification of the vehicle input to simulate an event in the "real world."

As shown in FIG. 2, the entertainment system 10 may be configured as a land course with interactive (or "combative") racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the transmission of a wireless signal 44 from the event element 42 to the event sensor in the first vehicle 12. The rule applied by the processor is an increase in the top velocity of the first vehicle 12, which simulates a turbo boost. On the "B section" of the course, the trigger event is a transmission of a wireless signal 44 from the event element 42 to the event sensor in the first vehicle 12. The rule applied by the processor is a decrease in the stability of the steering subsystem, which simulates an oil slick or ice patch. On the "C section" of the course, the trigger event is a transmission of a weapon signal 34 from the simulated weapon 32 on the first vehicle 12 to the event sensor on the second vehicle 36. The rule applied by the processor of the second vehicle 36 is a complete reduction of the vehicle input, which simulates a disabled or damaged vehicle.

As shown in FIG. 3, the entertainment system 10 may be configured as an advanced land course. The entertainment system 10 preferably includes multiple versions of vehicles, event elements, signals, event sensors, trigger events, rules, and physical events as described below. The entertainment system 10 also preferably includes controls for a moderator 48 and/or a spectator 50, a variation of the memory device 30, and the central processor 46. The entertainment system 10 may, however, include other suitable combinations of event elements, signals, event sensors, trigger events, rules, and physical events.

On the "A section" of the course, the trigger event is the transmission of a wireless signal 44 from the event element 42 (controlled by the moderator 48) to the event sensor of the first vehicle 12. The rule applied by the processor of the first vehicle 12 is a complete reduction of the vehicle input, which simulates a disabled or damaged vehicle. On the "B Section" of the course, the trigger event is the transmission of a wireless signal 44 from the event element 42 (controlled by the spectator 50) to the event sensor of the first vehicle 12. The rule applied by the processor is a decrease in the stability of the steering subsystem, which simulates an oil slick. On the "C Section" of the course, the trigger event is the creation of a magnetic field by the event element and the sensing of the magnetic field by the event sensor of the first vehicle 12 (at point 20). The rule applied by the processor is an increase in the top velocity of the first vehicle 12, which simulates a tail wind. Preferably, the rule is no longer applied when the event sensor no longer senses the magnetic field (at point 40). On the "D Section" of the course, the trigger event is the creation of a magnetic field by the event element and the sensing of the magnetic field by the event sensor of the first vehicle 12. The rule applied by the processor is a decrease in the top velocity of the first vehicle 12, which simulates a difficult terrain. Preferably, the rule is no longer applied when the event sensor no longer senses the magnetic field. On the "E Section" of the course, the event trigger is a transmission from the event element 42 to the event sensor of the first vehicle 12. The first vehicle provides a feedback signal to the first user that an item has been collected and allows later activation of the item through the activation device. The event sensor transmits an acknowledgement signal to the event element 42, which temporarily ceases the transmission of the signal from the event element 42. On the "F Section" of the course, the event trigger is the contact of the vehicle with a closed gate. The rule applied by the processor of the first vehicle 12 is a reduction of the top speed of the vehicle input, which simulates a damaged vehicle. Preferably, the processor does not apply this rule if the first user has previously collected a "gate key" item.

Figure 4:
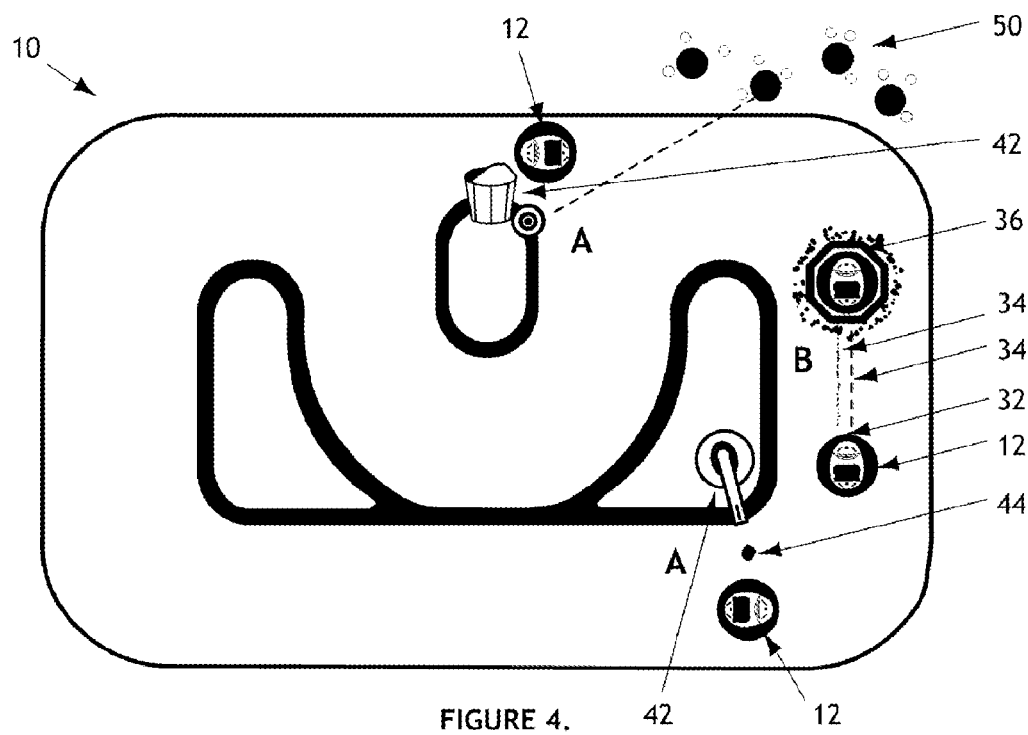
FIG. 4 is a third variation of the entertainment system configured as a water course.

As shown in FIG. 4, the entertainment system 10 may be configured as a water course with interactive (or "combative") racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the transmission of a wireless signal 44 from the event element 42 (controlled by the spectator 50) to the event sensor of the first vehicle 12. The rule applied by the processor of the first vehicle 12 is a partial reduction of the vehicle input, which simulates a damaged vehicle. In addition to transmitting a wireless signal, the event element 42 shoots water, which further increases the realism that the event element 42 is damaging the vehicle.

On the "B section" of the course, the trigger event is the transmission of a weapon signal 34 from the event element 42 (controlled by the second user of the second vehicle 36) to the event sensor of the first vehicle 12. The rule applied by the processor of the first vehicle 12 is a complete reduction of the vehicle input, which simulates a disabled vehicle. In addition to transmitting a weapon signal 34, the simulated weapon shoots water, which further increases the realism that the simulated weapon is damaging the first vehicle 12.

Figure 5:
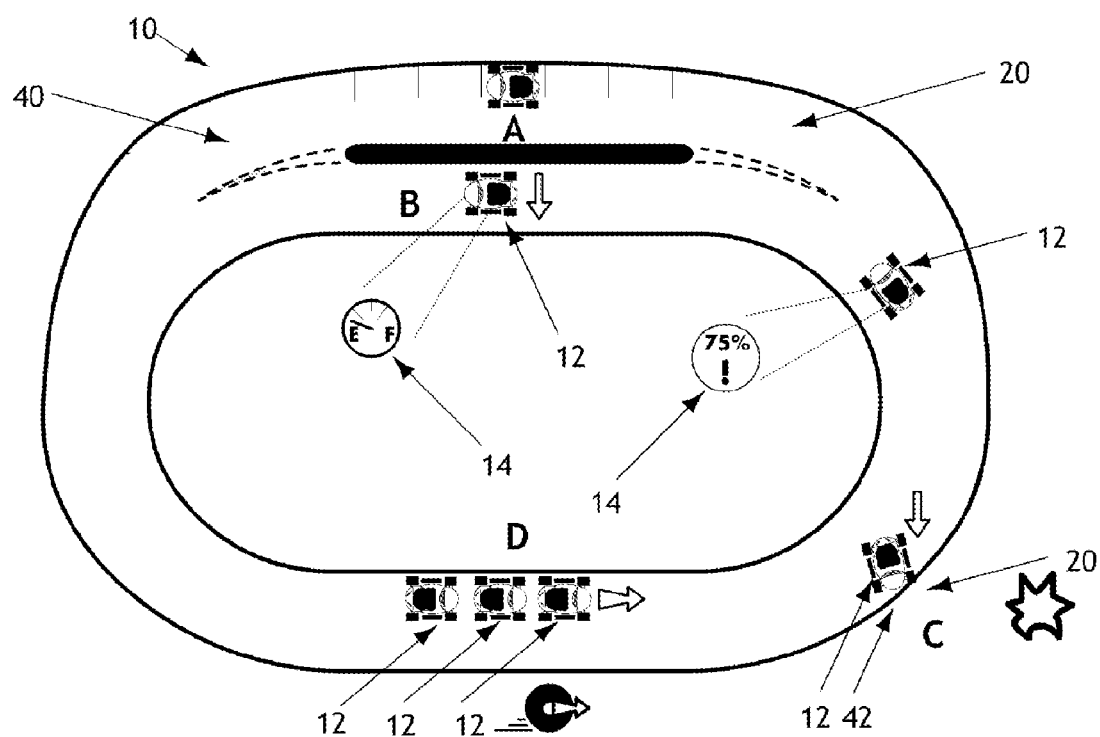
FIG. 5 is a fourth variation of the entertainment system configured as a "closed circuit" land course.

As shown in FIG. 5, the entertainment system 10 may be configured as a "closed circuit" land course with "Stock Car" style racing. The entertainment system 10 preferably includes multiple versions of vehicles, event elements, signals, event sensors, trigger events, rules, and physical events as described below. The entertainment system 10 may, however, include other suitable combinations of event elements, signals, event sensors, trigger events, rules, and physical events.

On the "A section" of the course, the trigger event is the usage of energy or the passage of time. The rule applied by the processor of the first vehicle 12 is a reduction of the top speed of the vehicle input, which simulates a vehicle with low available energy. On the "B Section" of the course, the trigger event is the contact of the first vehicle 12 with the physical barrier. The rule applied by the processor of the first vehicle 12 is a reduction of the top speed of the vehicle input, which simulates a damaged vehicle. These two rules are applied until the end of the round or until the event sensor senses that the first vehicle 12 has entered the "C Section" (also referred to as the "pit stop" area) of the course (which initiates a second trigger event). On the "D Section" of the course, the trigger event is the presence of two or more vehicles traveling in a line at close proximity above a minimum speed. The rule applied to the processor(s) of one or more of these vehicles is the increase of the top speed of the vehicle(s), which simulates a drafting technique used in sports racing to reduce the overall effect of drag resistance of the vehicles.

Although omitted for conciseness, the preferred embodiments include every combination and permutation of the various vehicles, the various event elements, the various trigger events, the various rules, and the various physical events.

As a person skilled in the art will recognize from the previous detailed description and from the figures and claims, modifications and changes can be made to the preferred embodiments of the invention without departing from the scope of this invention defined in the following claims.

We claim:

1. An entertainment system, comprising:
a first vehicle that transports a first user including:
a user interface adapted to accept a vehicle input from the first user;
an event sensor adapted to sense a plurality of trigger events;
a steering subsystem that is adapted to allow steering of the first vehicle and includes a disabled mode that reduces control of the first user over the steering of the vehicle;
a propulsion subsystem that is adapted to propel the vehicle and includes a disabled mode that reduces control of the first user over the propulsion of the vehicle, and includes an enhanced mode that increases input to the propulsion system;
a processor connected to the user interface and to the event sensor, and adapted to operate in the following modes:
normal mode—wherein the processor controls the first vehicle based substantially on the vehicle input from the first user; and
a plurality of simulation modes—wherein the processor controls at least one of the steering subsystem and the propulsion subsystem of the first vehicle based on a modification of the vehicle input from the first user according to simulate a physical event; wherein the plurality of simulation modes include:
a reduced traction simulation that activates the disabled mode of the steering subsystem,
a disabled simulation that activates the disabled mode of the propulsion subsystem, and
a turbo boost simulation that activates the enhanced mode of the propulsion subsystem;
a plurality of event elements separate from the first vehicle and adapted to communicate a trigger event to the event sensor;
wherein the processor transitions from normal mode to a simulation mode upon the sensing by the event sensor of a trigger event communicated from an event element.

2. The entertainment system of claim 1 wherein an event element of the plurality of event elements is a physical barrier, wherein the event sensor is adapted to sense contact between the first vehicle and the physical barrier, wherein a trigger event is a contact between the first vehicle and the physical barrier, wherein the disabled simulation mode is used to simulate a physical event of a crash of the vehicle.

3. The entertainment system of claim 1 wherein the event element is adapted to transmit a signal, wherein the event sensor is adapted to receive the signal.

4. The entertainment system of claim 3 wherein the event element is a simulated weapon adapted to be controlled by a user other than the first user and that transmits a weapon signal.

5. The entertainment system of claim 4 wherein the event element is further adapted to be modified by one of a moderator and a spectator.

6. The entertainment system of claim 3 wherein the event element is further adapted to be modified by the first user.

7. The entertainment system of claim 6 wherein the event sensor is further adapted to transmit an acknowledgement signal to the event element upon the successful receipt of the signal from the event element.

8. The entertainment system of claim 7 wherein the event element is further adapted to temporarily cease transmission of the signal upon the successful receipt of the acknowledgement signal from the event sensor.

9. The entertainment system of claim 1 wherein the processor transitions from operating in the normal mode to operating in the simulation mode upon the sensing by the event sensor of a first trigger event.

10. The entertainment system of claim 1 wherein the user interface includes an activation device adapted to be activated by a user, and wherein the processor operates in the normal mode until the sensing by the event sensor of a first trigger event and the activation by the user of the activation device.

11. The entertainment system of claim 1 wherein the event sensor is further adapted to sense a second trigger event; and wherein the processor transitions from operating in the normal mode to operating in the simulation mode upon the sensing by the event sensor of a first trigger event and transitions from operating in the simulation mode to operating in the normal mode upon the sensing by the event sensor of a second trigger event.

12. The entertainment system of claim 1 further comprising a memory device adapted to store the trigger events experienced by the first user during a particular round; wherein the first user may retrieve the stored trigger events thereby affecting the normal mode of the processor for the first vehicle of the first user in subsequent rounds.

13. The entertainment system of claim 1 further comprising:
 a second vehicle including:
  a user interface adapted to accept a vehicle input from a second user;
  an event sensor adapted to sense the first trigger event;
  a processor connected to the user interface and to the event sensor, and adapted to operate in the following modes:
   normal mode—wherein the processor controls the second vehicle based substantially on the vehicle input from the second user; and
   simulation mode—wherein the processor controls the second vehicle based on a modification of the vehicle input from the second user according to the first rule, which simulates a first physical event.

14. The entertainment system of claim 13 wherein the first vehicle further includes a simulated weapon adapted to transmit a weapon signal, wherein the event sensor of the second vehicle is adapted to receive the weapon signal.

15. The entertainment system of claim 13 further comprising a central processor separate from the first vehicle and the second vehicle, wherein the central processor is adapted to function as the processor for both the first vehicle and the second vehicle.

16. The entertainment system of claim 1 further including a second vehicle that transports a second user, wherein the second vehicle is substantially identical to the first vehicle.

17. The entertainment system of claim 1 wherein the processor transitions from operating in the normal mode to operating in the simulation mode upon the sensing by the event sensor of a trigger event communicated by an event element.

18. The entertainment system of claim 1 wherein the user interface includes an activation device adapted to be activated by a user, and wherein the processor operates in the normal mode until the sensing by the event sensor of a trigger event communicated by an event element and the activation by the user of the activation device.

19. The entertainment system of claim 1 wherein the plurality of trigger events includes a first trigger even and a second trigger event; and wherein the processor transitions from operating in the normal mode to operating in the simulation mode upon the sensing by the event sensor of the first trigger event communicated by an event element and transitions from operating in the simulation mode to operating in the normal mode upon the sensing by the event sensor of the second trigger event communicated by an event element.

20. The entertainment system of claim 1 wherein the enhanced mode of the propulsion system is adapted to increase input of the propulsion subsystem for at least one of increased acceleration and increased top speed.

21. The entertainment system of claim 1 wherein the event element transmits a physical element and the event sensor transitions from normal mode to simulation mode based on sensing the physical element.

22. The entertainment system of claim 21 wherein the physical element is a projectile.

23. The entertainment system of claim 3 wherein the processor transitions from operating in the normal mode to operating in the simulation mode upon the event sensor receiving the signal transmitted by the first event element.

24. The entertainment system of claim 7 wherein the event element temporarily ceases transmission of the signal when an acknowledge signal is received.

* * * * *